United States Patent [19]

Landrini

[11] Patent Number: 5,158,464
[45] Date of Patent: Oct. 27, 1992

[54] SAFETY BARRIER ASSEMBLY WITH BUILT-IN-CROSS WIRING

[75] Inventor: Glisente Landrini, Milan, Italy

[73] Assignee: Elcon Instruments Srl, Milan, Italy

[21] Appl. No.: 770,420

[22] Filed: Oct. 3, 1991

[30] Foreign Application Priority Data

Nov. 29, 1990 [IT] Italy .................. 22230 A/90

[51] Int. Cl.⁵ .............................................. H01R 9/08
[52] U.S. Cl. ............................................... 439/49
[58] Field of Search ................ 439/43–54, 439/60, 395–400

[56] References Cited

U.S. PATENT DOCUMENTS

| | | | |
|---|---|---|---|
| 3,760,328 | 9/1973 | Georgopulos | 439/49 |
| 4,764,849 | 8/1988 | Khan | 439/49 |
| 5,052,935 | 10/1991 | James et al. | 439/49 |

*Primary Examiner*—Joseph H. McGlynn
*Attorney, Agent, or Firm*—Banner, Birch, McKie & Beckett

[57] ABSTRACT

The present invention relates to the industrial field of wiring apparatus for cables and in particular to a connecting system for cables in intrinsic-safety industrial instrumentation boards. Directly on the assembling board where the intrinsic-safety modules for the protection of the process control systems are allocated, a plurality of connecting modules of the cross-wiring type are disposed to a card on which the intrinsic-safety modules relating to various protection devices are also disposed. In this manner all connecting cables coming from the various sensors distributed in an industrial plant can converge to this card in order to be sent to a central processing unit in a homogenous typology. The connecting modules are implemented on each card depending upon the plant extension and the amount of sensors present thereon.

13 Claims, 4 Drawing Sheets

SAFETY BARRIER ASSEMBLY WITH BUILT-IN-CROSS WIRING

BACKGROUND OF THE INVENTION

The present invention relates to a connecting system for cables in an electrical connection board, and in particular, to the cross-wiring of cables in an intrinsically safe industrial instrumentation board.

It is common practice in process control operations to associate physically adjacent field devices (i.e., transmitters, I/P converters, solenoid valves, contacts, sensors, etc.) with a common field junction box and to then connect a multiconductor cable to carry the signals to the control system. This technique drastically reduces wiring complexity and saves cost, but unfortunately, it also creates its own problems. For example, on each multicable coming from the field to the control system terminals, there is a specific sequence of devices and also a mixture of heterogeneous signals to be processed. However, most distributed control systems (DCS) are provided with termination units having a fixed array or pattern of homogeneus input functions, e.g. analog input, analog output, low level input, digital input, digital output, etc. Therefore, since sensor signals must be processed into sets of homogeneous functions, the problem arises of directing all multiconductor cables of homogeneous sensors towards the same terminal block so that they may later be connected not only to the various intrinsic safety modules, each of which performs a specific function, but also, to a central processing unit of the process control system.

Since the plurality of sensors and the number of corresponding multiconductor cables is generally large, attempts are made to gather all conductors coming from the same type of sensor onto the same terminal block. However, due to the large number and entanglement of cables, the various types of conductors coming from sensors performing the same function cannot be always directed in a homogeneous manner towards the access terminal block of the board.

Thus, there is a mismatch between the input signal sequences from the field and the termination unit sequences of the control system.

In the past, when a general control board was prepared, it was located in a cabinet of medium to large size and it was also necessary to prepare another cabinet, usually of substantially the same size, in which all intrinsic safety circuitry is located and where all cables coming from the sensors distributed on the process plant must be directed. Thus, by connecting the field multicables and the control system cables to a specially designed cabinet, termed a Marshalling Cabinet, the aforementioned problem was solved. The field multicables are wired to a first row of screw terminals, termed field terminals, and the DCS multicables from the safety barrier cabinet are wired to an opposed row of screw terminals. In this assembly, each field terminal can be hard wired to the corresponding control system terminal as required by the effective process control layout schematic. Thus, the necessary "cross-wiring" to obtain a homogeneous arrangement must be performed in a separate cabinet from the safety barrier cabinet.

Although various coding forms of colors and alphanumeric systems have been studied to simplify this situation, it is presently very onerous to wire all circuits relating to the intrinsically safe circuit modules directly in the same cabinet where the distribution and general-control board for an industrial plant is prepared.

In short, in the present state of the art the assembling necessary to simplify the connections relating to homogeneous functions performed by sensors of the same kind is rather arduous. Consequently, the possibility of safe and immediate access to the conductor or conductors and sensors or series of sensors performing the same function appears very hard not only during the the setting up but also when servicing, changes or repairs are necssary. It is almost always necessary to build a second cabinet designed to accommodate all terminal blocks, connections and intrinsic safety modules, thereby adding to the multiplicity of cables even further. An additional shortfall of the present state of the art is the difficulty involved when interfacing with a computer. In this instance, in addition to the intrinsic safety cabinet and Marshalling cabinet, it is also necessary to use yet another board in order to connect the output to a computer. Thus, the process of data acquisition in an intrinsically safe environment is even more burdensome.

The necessity therefore arises for a particularly simple and reliable assembly capable of providing the desired homogenous connections while avoiding the tangle of calbes created by the assemblies of the prior art.

SUMMARY OF THE INVENTION

It is an object of the present invention to solve the above mentioned problems by providing a connecting system for cables in intrinsically safe industrial instrumentation boards which enables a simple and reliable assembling of multiconductor cables while allowing signals coming from sensors performing the same function to be assembled together.

It is a further object of the present invention to enable one of ordinary skill in the art to easily single out the conductor and type of sensor for which it is necessary to intervene during the set-up, during the servicing, or any kind of operation.

The foregoing and further objects are attained in accordance with the present invention by providing an intrinsic safety industrial instrumentation board having a plurality of connecting modules of the cross-wiring type, already known per se, directly welded to a circuit card on which different intrinsic-safety circuit modules are also assembled, each of them being dedicated to a specific protection, as well as a card-edge input terminal block so that all connecting conductors coming from different sensors distributed on a plant for the industrial process control can be assembled on said card-edge input terminal block, to be then connected to the safety modules and subsequently through an output terminal block, connected to a central processing system by means of a connection using the cross-wiring connecting modules.

Further features and advantages of the invention will best be understood from the detailed description of the preferred embodiments hereinafter and with reference to the accompanying drawings.

DETAILED DESCRIPTION OF THE PREFERRED EMBODIMENTS

Figure 1:
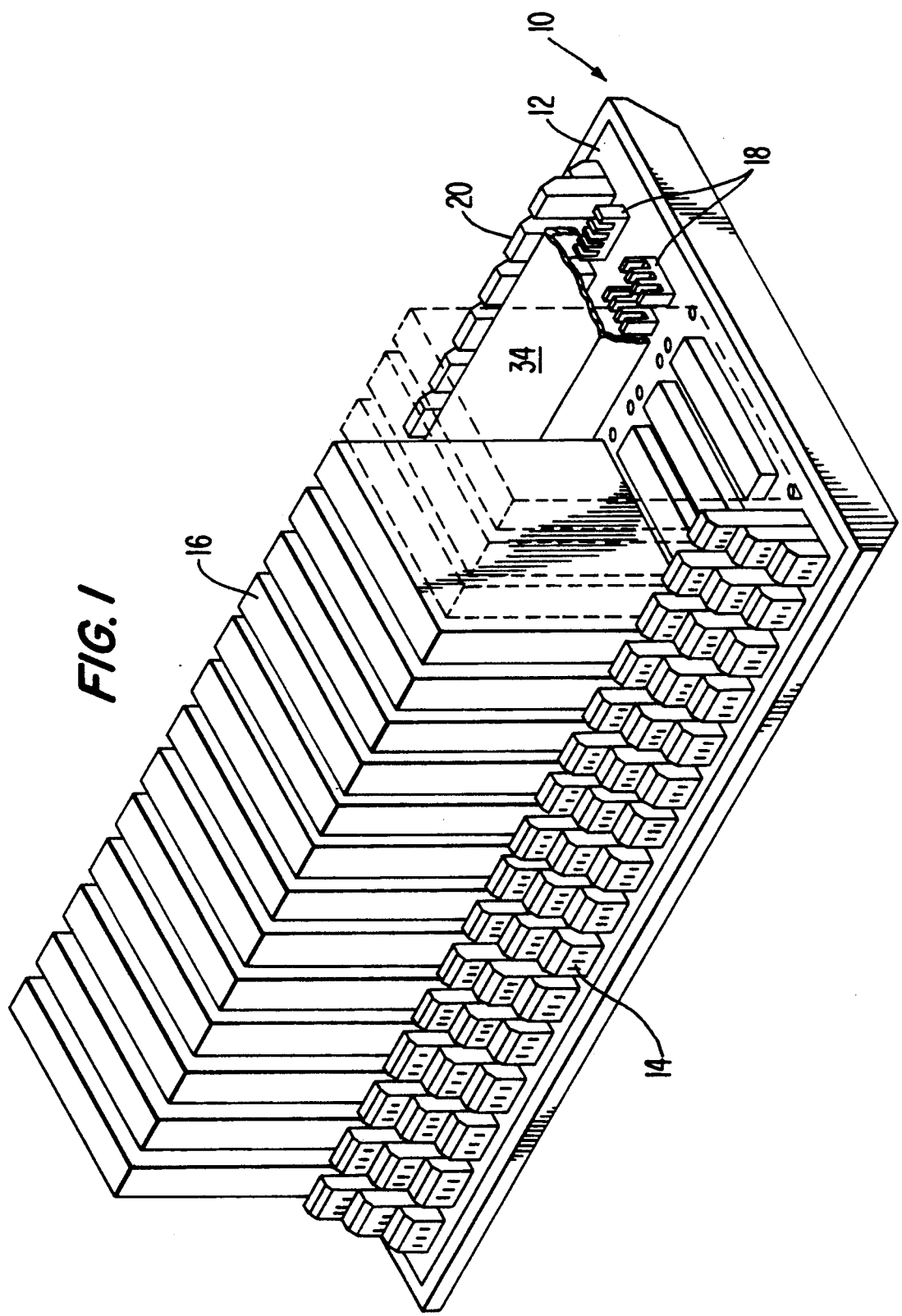
FIG. 1 is a perspective view illustrating the intrinsically safe instrumentation board of the present invention.
Figure 2:
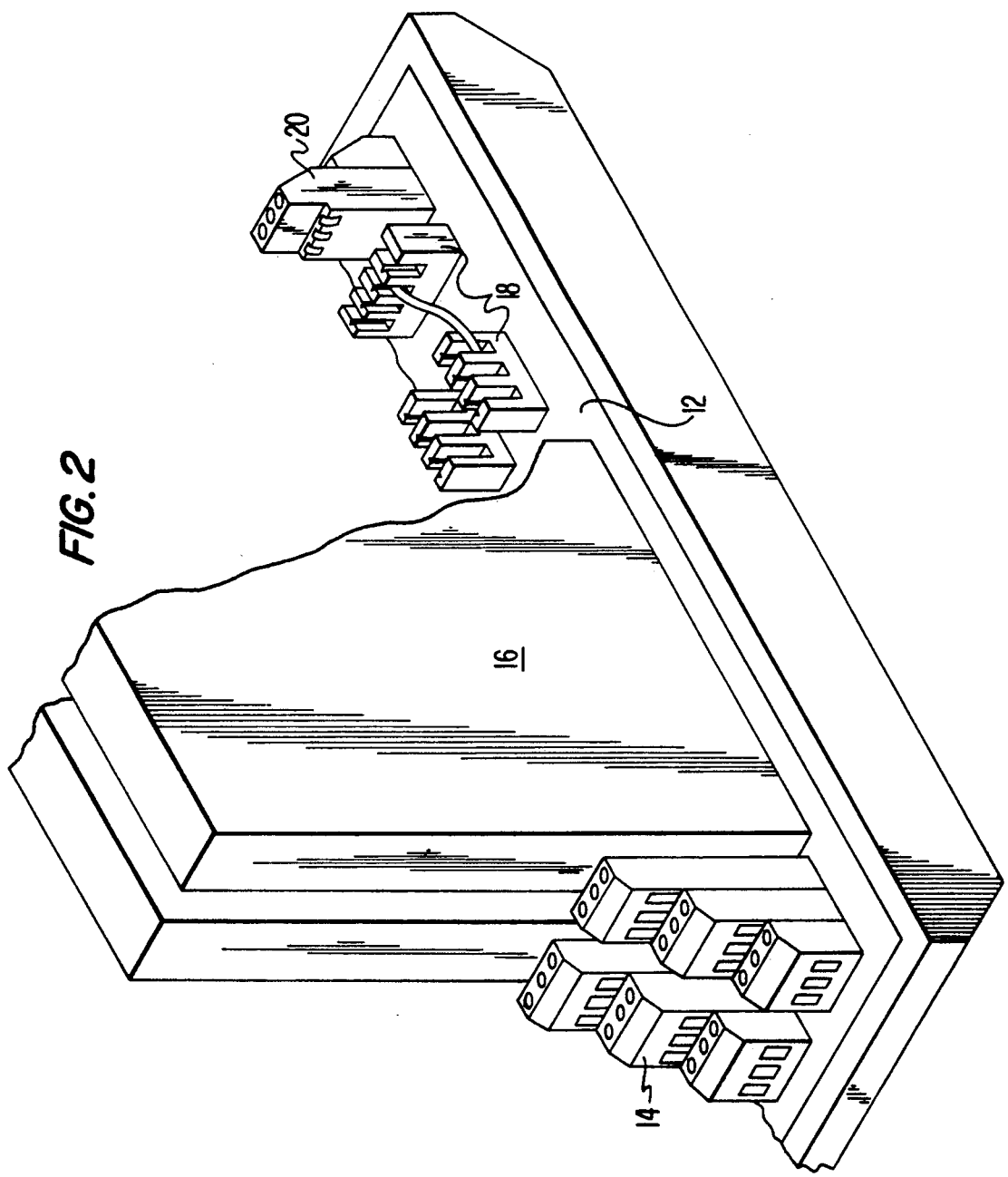
FIG. 2 is a schematic illustration showing a cross-wiring cable connection in accordance with the board of FIG. 1.

Referring to FIG. 1, the present invention includes an electric board support 10 on which a circuit card 12 is allocated. A plurality of card-edge input terminal blocks 14 for the access of the external conductors are disposed on said circuit card 12, and the inputs of a plurality of intrinsic-safety circuit modules 16, each relating to a specific type of sensor joined thereto, are connected to terminal blocks 14 through tracks on card 12. The outputs of modules 16 are connected, through tracks on card 12, to a number of insulation displacement connecting modules 18 of the cross-wiring type, which enable the conductors connected to modules 16 to be wired for connection to a central processing unit through output terminal blocks 20. A protective cover 34 is also provided over cross-wiring modules 18.

Figure 3:
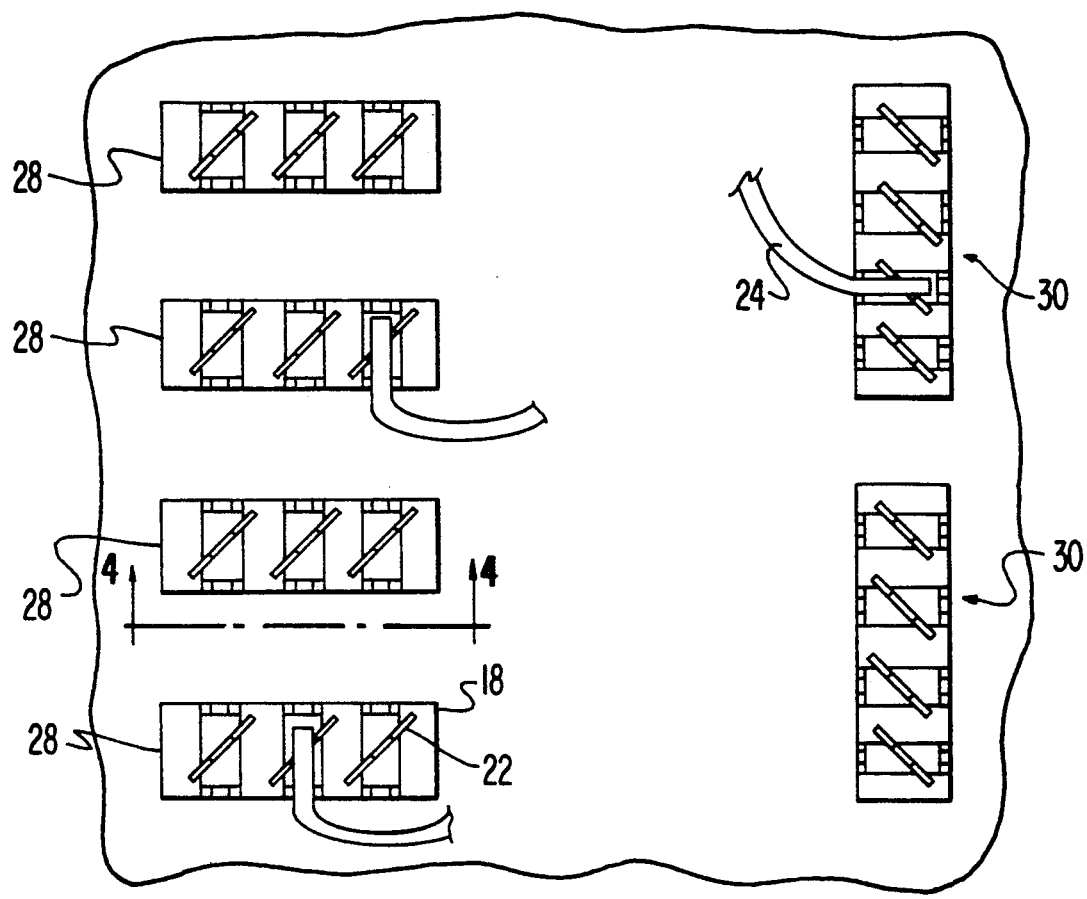
FIG. 3 is a schematic illustration showing the cross-wiring feature of the present invention.

As shown in FIG. 3, connecting modules 18 of the cross-wiring type are structured on card 12 in two aligned arrays, input modules 28 and output modules 30, so as to enable a homogenous and orderly connection bringing about a homogenous sequence of circuit functions at the output. In a preferred embodiment, the number of input modules 28 is equal to the number of channels from intrisic safety circuit modules 16 and the number of output modules 30 is equal to one half the number of channels. Input modules 28 preferably have three terminal sites defined by blades 22 and output modules 30 have four terminal sites also defined by blades 22. As shown in FIG. 3, output modules 30 are disposed at a 90° angle to input modules 28.

Figure 4:
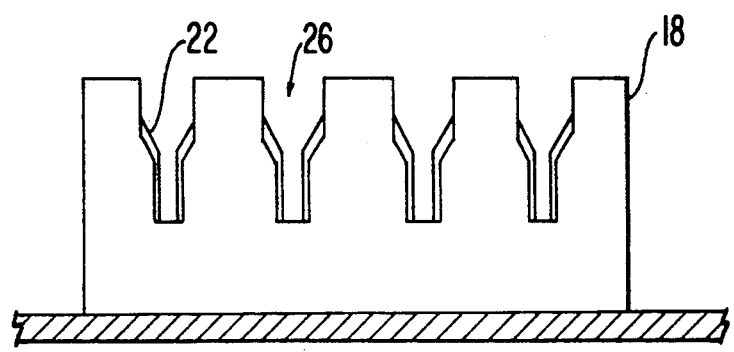
FIG. 4 is a cross-sectional view taken generally along the line 4—4 of FIG. 3.
Figure 6:
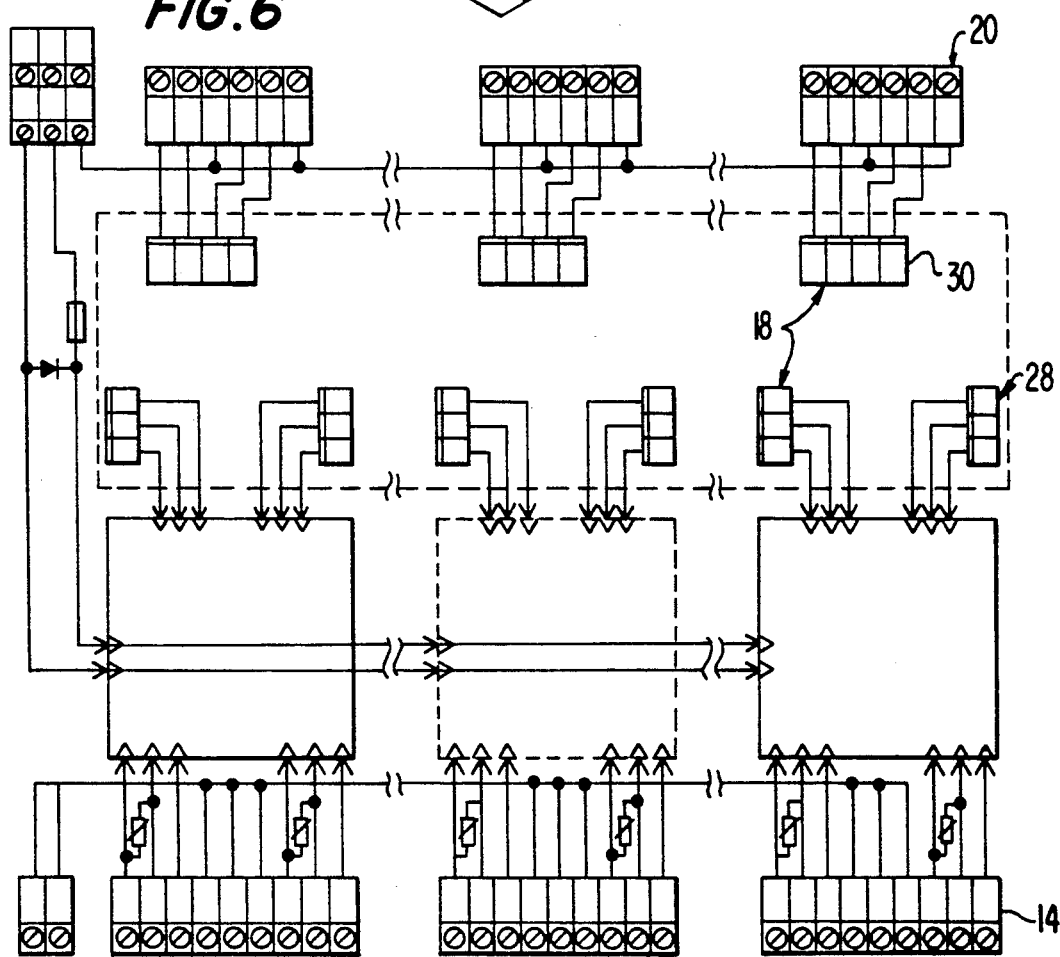
FIG. 6 is a circuitry diagram of the intrinsically safe board shown in FIG. 1.

Referring to FIG. 6, modules 18 are connected to card 12 by means of pins thereby ensuring the circuit continuity with the various card tracks as in any integrated component to be connected to a card. As shown in FIGS. 3 and 4, true connection is ensured in cross-wiring modules 18 by contact blades 22 that cut the conductor present in each cable 24 after piercing the conductor insulating sheath. More particularly, once a conductor is fitted into the hollow arranged on the upper part of modules 18, by means of a suitable tool, some blades 22 present in module 18 will cut the insulating sheath of the conductor as far as the conductor core. In a preferred embodiment, blades 22 are disposed within module 18 at a 45° angle with respect to cable 24. Since the above modules are provided with several hollows 26, they can be multipole modules. Due to the depth of each hollow 26, it is also possible to place more than one cable 24 between each pair of blades 22. Thus, the capacity of modules 18 and the overall density of board 10 is increased.

The plurality of modules 18 welded to card 12 enables the achievement of an orderly sequence of signals and related functions on terminal blocks 20 starting from a non-homogenous sequence of signals present on the output side of modules 16, by suitably arranging, for each module 16, the optimal conversion of the output connection thereof. As a result, once all conductors coming from the various sensors distributed at the industrial plant are connected to terminal blocks 14 in a non-homogenous manner, the connecting modules 18 by carrying out the necessary connection changes at the output, can arrange a sequence of signals and functions for a central processor which are consistent with the requirements from the central processor input. In addition, the connections through modules 18 can be implemented and changed at will depending upon the specific requirements of each plant and therefore the amount of sensors and corresponding conductors to be connected in each plant.

In short, it will be recognized that, although the conductors are assembled on the input terminal blocks 14 in a non-homogenous manner, through connecting modules 18 said conductors can then be arranged according to a homogenous signal or function typology so that they can be afterwards directed towards the central processor through terminal blocks 20. This is possible due to the fact that the connection is very simple and quick.

Figure 5:
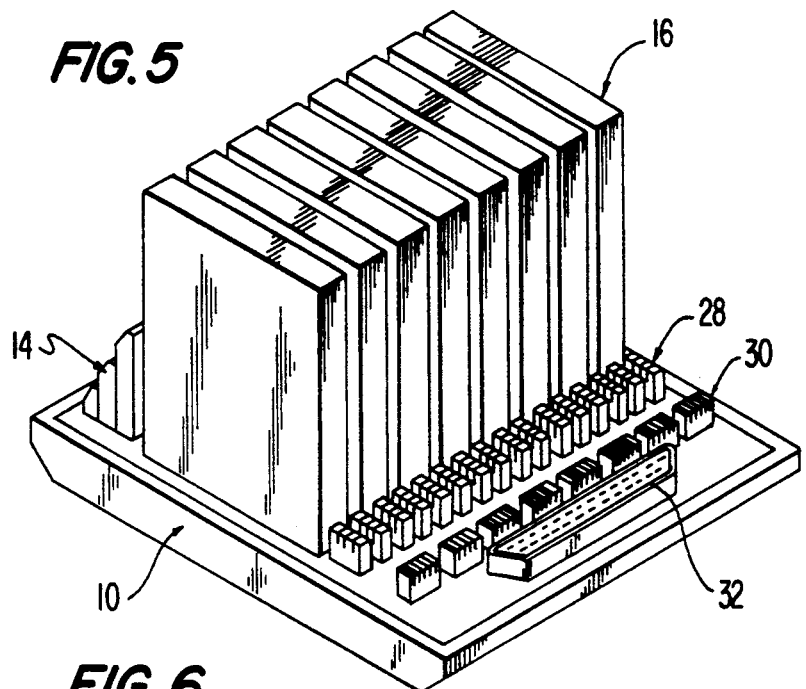
FIG. 5 is a perspective view illustrating another embodiment of the intrinsically safe board shown in FIG. 1.

Referring to FIG. 5, a second embodiment of the present invention is illustrated. In this embodiment, output terminal blocks 20 are replaced by a multiport connector 32, such as the twenty-five or fifty pin DIN connectors commonly used in computer applications. Connector 32 provides a fixed order output for the random input to input terminals 14. As in the previous embodiment, the random input can be rearranged as desired due to the cross-wiring modules 28 and 30 disposed on the board 10. Thus, an intrinsically safe computer interface may be achieved in a single board thereby simplifying data acquisition and process control systems.

The whole support board 10 and the related components are enclosed in a cabinet which may also comprise several different boards 10, or in the same control and general board cabinet of the plant to be submitted to protection, or in an adjacent cabinet when it is not physically possible to act otherwise. In this regard, it should be noted that the cross-wiring connection can also be carried out between modules 18 belonging to different support boards 10. In fact, using the described boards 10 with the built-in connecting modules 18 it is possible to simplify the connecting modalities of the intrinsic-safety systems present in industrial plants so as to make the connection quicker, more reliable and advantageous from an economic point of view.

It will be obvious to one of ordinary skill in the art that numerous modifications may be made without departing from the true spirit and scope of the invention which is to be limited only by the appended claims.

I claim:

1. A connecting system for cables on an intrinsic-safety industrial instrumentation board comprising:

a plurality of card-edge input terminal blocks disposed on said board;

a plurality of card-edge output terminal blocks disposed on said board;

a plurality of safety barriers disposed on said board between said input terminal blocks and said output terminal blocks; and a plurality of cross-wiring connecting modules disposed on said board between said safety barriers and said output terminal blocks;

wherein a plurality of conductors coming from different sensors in a plant subject to industrial process control can be assembled on said input terminal block in a nonhomogeneous manner and then connected to a central processing system in a homogeneous manner by using said cross-wiring modules.

2. A connecting system according to claim 1, wherein said cross-wiring connecting modules are disposed on said board in a linear arrangement such that a sufficient number of modules are provided depending upon the function requirements from the plant to which they are connected.

3. A connecting system according to claim 1, wherein said cross-wiring connecting modules are connected to said board through riveting.

4. A connecting system according to claim 1, wherein said cross-wiring connecting modules are connected to said board through welding.

5. A connecting system according to claim 1, wherein each of said cross-wiring connecting modules includes at least one connection for a conductor.

6. A safety barrier assembly comprising:
an electric circuit board;
a plurality of card-edge input terminal blocks disposed on said board;
a plurality of input cables coming into said input terminal blocks;
a plurality of card-edge output terminal blocks disposed on said board;
a plurality of output cables going from said output terminal blocks to a central processing control system;
a plurality of safety barriers disposed on said board between said input terminal blocks and said output terminal blocks; and
a plurality of cross-wiring connecting modules disposed on said board between said safety barriers and said output terminal blocks;
wherein said plurality of cables come from different sensors in a plant subject to said process control system and are assembled on said input terminal blocks in a nonhomogeneous manner, and are connected to said central processing system from said output terminals in a homogeneous manner through said cross-wiring modules.

7. The safety barrier according to claim 6 wherein said cross-wiring connecting modules include a plurality of insulation displacement connectors.

8. The safety barrier according to claim 7 wherein said insulation displacement connectors comprise a pair of blades such that an insulative cover on a connecting cable can thereby be pierced, said blades being disposed at a 45° angle with respect to said connecting cable.

9. The safety barrier according to claim 6 wherein said cross-wiring connecting modules are arranged in two linear rows, one of said rows including a plurality of input cross-wiring connecting modules and said other row includes a plurality of output cross-wiring connecting modules.

10. The safety barrier according to claim 9 wherein a connecting cable is disposed between one of said input cross-wiring connecting modules and one of said output cross-wiring connecting modules such that a nonhomogenous input to said input modules can be freely rearranged to satisfy a specified process control requirement and to thereby present a homogenous output from said output modules.

11. The safety barrier according to claim 9 wherein for each of said plurality of output modules there are two of said input modules.

12. The safety barrier according to claim 11 wherein each of said input modules has three terminal sites and each of said output modules has four terminal sites.

13. A safety barrier assembly for computer applications comprising:
an electric circuit board;
a plurality of card-edge input terminal blocks disposed on said board;
a plurality of input cables coming into said input terminal blocks;
a multiport output connector disposed on said board;
a plurality of output cables going from said output connector to a control system;
a plurality of safety barriers disposed on said board between said input terminal blocks and said output connector; and
a plurality of cross-wiring connecting modules disposed on said board between said safety barriers and said output connector;
wherein said plurality of cables are assembled on said input terminal blocks in a nonhomogeneous manner, and are connected to said control system from said output connector in a homogeneous manner through said cross-wiring modules.

* * * * *